(12) United States Patent
Fell et al.

(10) Patent No.: US 8,086,517 B2
(45) Date of Patent: *Dec. 27, 2011

(54) SYSTEM AND METHOD FOR CONSTRAINING DEPLETION AMOUNT IN A DEFINED TIME FRAME

(75) Inventors: Robert M. Fell, Summerland, CA (US); Scott Painter, Bel Air, CA (US); Michael R. Bonsignore, Seattle, WA (US); Brian P. Reed, Southlake, TX (US); Gary A. Magnuson, Corpus Christi, TX (US)

(73) Assignee: Pricelock, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/076,741

(22) Filed: Mar. 31, 2011

(65) Prior Publication Data

US 2011/0178916 A1 Jul. 21, 2011

Related U.S. Application Data

(63) Continuation of application No. 12/099,237, filed on Apr. 8, 2008, now Pat. No. 7,945,501.

(60) Provisional application No. 60/922,488, filed on Apr. 9, 2007, provisional application No. 60/922,520, filed on Apr. 9, 2007.

(51) Int. Cl.
*G06Q 40/00* (2006.01)
(52) U.S. Cl. .......................... 705/36 R; 705/35; 705/37
(58) Field of Classification Search ............... 705/35, 705/36 R, 37
See application file for complete search history.

(56) References Cited

U.S. PATENT DOCUMENTS

| 3,691,527 A | 9/1972 | Yamamoto |
| 3,852,576 A | 12/1974 | Rudd |
| 4,723,212 A | 2/1988 | Mindrum et al. |
| 4,821,186 A | 4/1989 | Munakata et al. |
| 4,825,045 A | 4/1989 | Humble |
| 4,910,672 A | 3/1990 | Off et al. |
| 5,056,019 A | 10/1991 | Schultz et al. |

(Continued)

FOREIGN PATENT DOCUMENTS

AU 2006100751 A4 12/2006
(Continued)

OTHER PUBLICATIONS

Final Office Action issued for U.S. Appl. No. 12/030,119 mailed on Jul. 8, 2011, 5 pgs.

(Continued)

*Primary Examiner* — Lalita Hamilton
(74) *Attorney, Agent, or Firm* — Sprinkle IP Law Group

(57) ABSTRACT

Embodiments disclosed herein provide price protection on commodity purchases in which a consumer can select, accept, or otherwise agree to a depletion constraint on the consumption of the commodity thus purchased. Based on the agreed depletion constraint, a provider may adjust terms and/or the price of the price protection. In some embodiments, the depletion constraint can be time-based, quantity-based, value-based, or a combination thereof. In some embodiments, the depletion constraint can be linear. In some embodiments, a consumer may be required to purchase a certain amount of the commodity during a specified time frame. In some embodiments, the provider of the price protection may receive a payment from the consumer when the retail price of the commodity at the time of the purchase is below a specified floor price. In some embodiments, the commodity is motor fuel.

20 Claims, 5 Drawing Sheets

U.S. PATENT DOCUMENTS

| | | |
|---|---|---|
| 5,173,851 A | 12/1992 | Off et al. |
| 5,200,889 A | 4/1993 | Mori |
| 5,202,826 A | 4/1993 | McCarthy |
| 5,481,094 A | 1/1996 | Suda |
| 5,521,364 A | 5/1996 | Kimura et al. |
| 5,612,868 A | 3/1997 | Off et al. |
| 5,710,887 A | 1/1998 | Chelliah et al. |
| 5,806,045 A | 9/1998 | Biorge et al. |
| 5,822,735 A | 10/1998 | De Lapa et al. |
| 5,862,222 A | 1/1999 | Gunnarsson |
| 5,873,069 A | 2/1999 | Reuhl et al. |
| 5,890,137 A | 3/1999 | Koreeda |
| 6,078,900 A | 6/2000 | Ettl et al. |
| 6,098,879 A | 8/2000 | Terranova |
| 6,112,981 A | 9/2000 | McCall |
| 6,116,505 A | 9/2000 | Withrow |
| 6,145,741 A | 11/2000 | Wisdom et al. |
| 6,151,565 A | 11/2000 | Lobley et al. |
| 6,152,591 A | 11/2000 | McCall et al. |
| 6,157,871 A | 12/2000 | Terranova |
| 6,193,155 B1 | 2/2001 | Walker et al. |
| 6,249,772 B1 | 6/2001 | Walker et al. |
| 6,298,329 B1 | 10/2001 | Walker et al. |
| 6,321,984 B1 | 11/2001 | McCall et al. |
| 6,332,128 B1 | 12/2001 | Nicholson |
| 6,422,464 B1 | 7/2002 | Terranova |
| 6,526,277 B1 | 2/2003 | Zicker et al. |
| 6,594,644 B1 | 7/2003 | Van Dussen |
| 6,601,033 B1 | 7/2003 | Sowinski |
| 6,611,811 B1 | 8/2003 | Deaton |
| 6,637,648 B1 | 10/2003 | Gilgen et al. |
| 6,732,081 B2 | 5/2004 | Nicholson |
| 6,741,968 B2 | 5/2004 | Jacoves et al. |
| 6,741,969 B1 | 5/2004 | Chen et al. |
| 6,754,636 B1 | 6/2004 | Walker |
| 6,778,967 B1 | 8/2004 | Nicholson |
| 6,862,580 B1 | 3/2005 | Ford |
| 6,862,612 B1 | 3/2005 | Horn |
| 6,885,996 B2 | 4/2005 | Nicholson |
| 6,950,806 B2 | 9/2005 | Dines et al. |
| 6,965,872 B1 | 11/2005 | Grdina |
| 6,980,960 B2 | 12/2005 | Hajdukiewicz et al. |
| 7,054,837 B2 | 5/2006 | Hoffman et al. |
| 7,080,026 B2 | 7/2006 | Singh et al. |
| 7,080,034 B1 | 7/2006 | Reams |
| 7,092,929 B1 | 8/2006 | Dvorak et al. |
| 7,162,444 B1 | 1/2007 | Machado, Jr. et al. |
| 7,188,076 B2 | 3/2007 | Bensemana |
| 7,337,122 B2 | 2/2008 | Eydeland et al. |
| 7,343,341 B2 | 3/2008 | Sandor et al. |
| 7,346,520 B2 | 3/2008 | Etzioni et al. |
| 7,373,320 B1 | 5/2008 | McDonough |
| 7,376,580 B1 | 5/2008 | Walker et al. |
| 7,376,603 B1 | 5/2008 | Mayr et al. |
| 7,379,890 B2 | 5/2008 | Myr et al. |
| 7,383,204 B2 | 6/2008 | McCall et al. |
| 7,437,323 B1 | 10/2008 | Valkov et al. |
| 7,617,111 B1 | 11/2009 | Sheppard et al. |
| 7,650,109 B2 | 1/2010 | Shimakawa et al. |
| 7,747,500 B2 | 6/2010 | Hwang et al. |
| 7,945,500 B2 | 5/2011 | Fell et al. |
| 7,945,501 B2 | 5/2011 | Fell et al. |
| 8,019,694 B2 | 9/2011 | Fell et al. |
| 2001/0039512 A1 | 11/2001 | Nicholson |
| 2001/0042036 A1 | 11/2001 | Sanders |
| 2001/0049626 A1 | 12/2001 | Nicholson |
| 2001/0049651 A1 | 12/2001 | Selleck |
| 2001/0049668 A1 | 12/2001 | Wright |
| 2002/0013758 A1 | 1/2002 | Khaitan |
| 2002/0026403 A1 | 2/2002 | Tambay et al. |
| 2002/0029171 A1 | 3/2002 | Senior |
| 2002/0035549 A1 | 3/2002 | Hagio et al. |
| 2002/0038279 A1 | 3/2002 | Samuelson et al. |
| 2002/0040321 A1 | 4/2002 | Nicholson |
| 2002/0069155 A1 | 6/2002 | Nafeh et al. |
| 2002/0073007 A1 | 6/2002 | Ayache |
| 2002/0107642 A1 | 8/2002 | Nishida et al. |
| 2002/0120555 A1 | 8/2002 | Lerner |
| 2002/0138392 A1 | 9/2002 | LeBlanc |
| 2002/0143616 A1 | 10/2002 | Hajdukiewicz |
| 2002/0143693 A1 | 10/2002 | Soestbergen et al. |
| 2002/0161645 A1 | 10/2002 | Walker et al. |
| 2002/0165809 A1 | 11/2002 | Gendelman |
| 2002/0194094 A1 | 12/2002 | Lancaster et al. |
| 2003/0014287 A1 | 1/2003 | Williams et al. |
| 2003/0018573 A1 | 1/2003 | Comas et al. |
| 2003/0033154 A1 | 2/2003 | Hajdukiewicz |
| 2003/0050807 A1 | 3/2003 | Hoffman et al. |
| 2003/0074267 A1 | 4/2003 | Acharya et al. |
| 2003/0078787 A1 | 4/2003 | Hoffman et al. |
| 2003/0088435 A1 | 5/2003 | King |
| 2003/0088466 A1 | 5/2003 | Fitzpatrick |
| 2003/0101123 A1 | 5/2003 | Alvarado et al. |
| 2003/0101125 A1 | 5/2003 | McGill et al. |
| 2003/0158773 A1 | 8/2003 | Brunner |
| 2003/0195822 A1 | 10/2003 | Tatge et al. |
| 2003/0197060 A1 | 10/2003 | Coyner |
| 2003/0208430 A1 | 11/2003 | Gershon |
| 2003/0208437 A1 | 11/2003 | Samuelson |
| 2003/0229571 A1 | 12/2003 | May |
| 2003/0236738 A1 | 12/2003 | Lange et al. |
| 2004/0015454 A1 | 1/2004 | Raines et al. |
| 2004/0024692 A1 | 2/2004 | Turbeville et al. |
| 2004/0034584 A1 | 2/2004 | Cory, Sr. et al. |
| 2004/0039684 A1 | 2/2004 | Sandor |
| 2004/0088179 A1 | 5/2004 | Cogen et al. |
| 2004/0093298 A1 | 5/2004 | McClure, III et al. |
| 2004/0103003 A1 | 5/2004 | Mayers et al. |
| 2004/0111358 A1 | 6/2004 | Lange et al. |
| 2004/0117291 A1 | 6/2004 | O'Callahan |
| 2004/0122732 A1 | 6/2004 | Comer |
| 2004/0122764 A1 | 6/2004 | Bilski et al. |
| 2004/0128263 A1 | 7/2004 | Dosanjh |
| 2004/0148236 A1 | 7/2004 | Steidlmayer |
| 2004/0148249 A1 | 7/2004 | Kinnear |
| 2004/0158493 A1 | 8/2004 | Nicholson |
| 2004/0177019 A1 | 9/2004 | Slavov et al. |
| 2004/0210478 A1 | 10/2004 | Pettigrew et al. |
| 2004/0215529 A1 | 10/2004 | Foster et al. |
| 2004/0230493 A1 | 11/2004 | Tatge et al. |
| 2004/0230520 A1 | 11/2004 | Reding et al. |
| 2004/0260613 A1 | 12/2004 | Mills |
| 2004/0260632 A1 | 12/2004 | Wanasek |
| 2005/0027650 A1 | 2/2005 | Walker |
| 2005/0044001 A1 | 2/2005 | Narayanaswami |
| 2005/0091139 A1 | 4/2005 | Kumar et al. |
| 2005/0097025 A1 | 5/2005 | Horton et al. |
| 2005/0114252 A1 | 5/2005 | Beurskens |
| 2005/0144100 A1 | 6/2005 | Shapiro et al. |
| 2005/0149402 A1 | 7/2005 | Nicholson |
| 2005/0154669 A1 | 7/2005 | Streetman |
| 2005/0159974 A1 | 7/2005 | Moss et al. |
| 2005/0160006 A1 | 7/2005 | Pate |
| 2005/0160014 A1 | 7/2005 | Moss et al. |
| 2005/0182660 A1 | 8/2005 | Henley |
| 2005/0192711 A1 | 9/2005 | Raines et al. |
| 2005/0209917 A1 | 9/2005 | Anderson et al. |
| 2005/0209921 A1 | 9/2005 | Roberts et al. |
| 2005/0216384 A1 | 9/2005 | Partlow et al. |
| 2005/0228747 A1 | 10/2005 | Gumport |
| 2005/0240492 A1 | 10/2005 | Grdina |
| 2005/0261916 A1 | 11/2005 | McCall |
| 2005/0289021 A1 | 12/2005 | Lagergren |
| 2006/0015424 A1 | 1/2006 | Esposito et al. |
| 2006/0026095 A1 | 2/2006 | Alvarado et al. |
| 2006/0031123 A1 | 2/2006 | Leggett et al. |
| 2006/0036530 A1 | 2/2006 | Shkedy |
| 2006/0080196 A1 | 4/2006 | Griffin et al. |
| 2006/0080265 A1 | 4/2006 | Hinds et al. |
| 2006/0085252 A1 | 4/2006 | Kersenbrock |
| 2006/0095362 A1* | 5/2006 | Hwang et al. .................. 705/37 |
| 2006/0155423 A1 | 7/2006 | Budike |
| 2006/0184445 A1 | 8/2006 | Sandor et al. |
| 2006/0190383 A1 | 8/2006 | May |
| 2006/0190386 A1 | 8/2006 | Levy |
| 2006/0212384 A1 | 9/2006 | Spurgin et al. |
| 2006/0212393 A1 | 9/2006 | Brown |

| | | | |
|---|---|---|---|
| 2006/0218056 A1 | 9/2006 | Dickman | |
| 2006/0241951 A1 | 10/2006 | Cynamom et al. | |
| 2006/0293947 A1 | 12/2006 | Nicholson | |
| 2006/0293952 A1 | 12/2006 | Nicholson | |
| 2006/0293953 A1 | 12/2006 | Nicholson | |
| 2006/0293980 A1 | 12/2006 | Corby et al. | |
| 2007/0016502 A1 | 1/2007 | Williamson et al. | |
| 2007/0032941 A1 | 2/2007 | Allen | |
| 2007/0038553 A1 | 2/2007 | Miller et al. | |
| 2007/0061174 A1 | 3/2007 | Phillips | |
| 2007/0061220 A1 | 3/2007 | Vaid | |
| 2007/0095890 A1 | 5/2007 | Elefant | |
| 2007/0106559 A1 | 5/2007 | Harrell | |
| 2007/0195486 A1 | 8/2007 | Paul et al. | |
| 2007/0198385 A1 | 8/2007 | McGill et al. | |
| 2007/0203793 A1 | 8/2007 | Hajdukiewicz et al. | |
| 2007/0203794 A1 | 8/2007 | Hajdukiewicz et al. | |
| 2007/0233616 A1 | 10/2007 | Richards et al. | |
| 2007/0255457 A1 | 11/2007 | Whitcomb et al. | |
| 2007/0267479 A1 | 11/2007 | Nix et al. | |
| 2007/0267482 A1 | 11/2007 | Ruckart et al. | |
| 2007/0276738 A1 | 11/2007 | Rajunas, III | |
| 2007/0288312 A1 | 12/2007 | Wang | |
| 2007/0294159 A1 | 12/2007 | Cottleq | |
| 2008/0005008 A1 | 1/2008 | Alvarado et al. | |
| 2008/0015964 A1* | 1/2008 | Shuster | 705/36 R |
| 2008/0015976 A1 | 1/2008 | Sandor et al. | |
| 2008/0015981 A1 | 1/2008 | Danesh | |
| 2008/0027737 A1 | 1/2008 | Watkins | |
| 2008/0033833 A1 | 2/2008 | Senior | |
| 2008/0080682 A1 | 4/2008 | Ogunwale et al. | |
| 2008/0097877 A1 | 4/2008 | Rahal | |
| 2008/0097888 A1 | 4/2008 | Sugihara | |
| 2008/0114622 A1 | 5/2008 | Crean et al. | |
| 2008/0126208 A1 | 5/2008 | Nicholson et al. | |
| 2008/0133430 A1 | 6/2008 | Horowitz | |
| 2008/0243663 A1 | 10/2008 | Eveland | |
| 2009/0198621 A1 | 8/2009 | Schneier et al. | |
| 2010/0042488 A1 | 2/2010 | McClung, III | |

FOREIGN PATENT DOCUMENTS

| | | | |
|---|---|---|---|
| AU | 2007100932 A4 | 10/2007 | |
| CA | 2070736 A1 | 12/1992 | |
| CA | 2217739 A1 | 10/1996 | |
| CA | 2340966 A1 | 9/2001 | |
| JP | 2217998 A | 8/1990 | |
| JP | 04373069 A | 12/1992 | |
| JP | 10111985 A | 4/1998 | |
| JP | 2002063347 A | 2/2002 | |
| JP | 2002215640 A | 8/2002 | |
| JP | 2003108850 A | 4/2003 | |
| JP | 2003128198 A | 5/2003 | |
| JP | 2003233743 A | 8/2003 | |
| JP | 2004145534 A1 | 5/2004 | |
| JP | 2004252569 A | 9/2004 | |
| JP | 2004318422 A | 11/2004 | |
| JP | 2005122766 A | 5/2005 | |
| JP | 2005135347 A | 5/2005 | |
| JP | 2006335438 A | 12/2006 | |
| JP | 2007122592 A | 5/2007 | |
| JP | 2007249410 A | 9/2007 | |
| WO | WO9118373 A1 | 11/1991 | |
| WO | WO9214213 A1 | 8/1992 | |
| WO | WO9301466 A1 | 1/1993 | |
| WO | WO9309398 A1 | 5/1993 | |
| WO | WO9606415 A1 | 2/1996 | |
| WO | WO9706250 A1 | 2/1997 | |
| WO | WO9818053 A1 | 4/1998 | |
| WO | WO9835490 A1 | 8/1998 | |
| WO | WO0003022 A2 | 1/2000 | |
| WO | WO0104327 A1 | 1/2001 | |
| WO | WO0125875 A2 | 4/2001 | |
| WO | WO0125989 A1 | 4/2001 | |
| WO | WO0126000 A1 | 4/2001 | |
| WO | WO0126003 A1 | 4/2001 | |
| WO | WO0155885 A2 | 8/2001 | |
| WO | WO0161671 A | 8/2001 | |
| WO | WO0177961 A1 | 10/2001 | |
| WO | WO0188743 A2 | 11/2001 | |
| WO | WO0195225 A1 | 12/2001 | |
| WO | WO0211018 A1 | 2/2002 | |
| WO | WO0212113 A1 | 2/2002 | |
| WO | WO0213091 A1 | 2/2002 | |
| WO | WO0217193 A1 | 2/2002 | |
| WO | WO0233621 A1 | 4/2002 | |
| WO | WO0233635 A1 | 4/2002 | |
| WO | WO0233636 A1 | 4/2002 | |
| WO | WO0233637 A1 | 4/2002 | |
| WO | WO0241120 A2 | 5/2002 | |
| WO | WO0244847 A2 | 6/2002 | |
| WO | WO02061663 A2 | 8/2002 | |
| WO | WO02069109 A2 | 9/2002 | |
| WO | WO02069110 A2 | 9/2002 | |
| WO | WO02075485 A2 | 9/2002 | |
| WO | WO02075488 A2 | 9/2002 | |
| WO | WO02079923 A2 | 10/2002 | |
| WO | WO02079940 A2 | 10/2002 | |
| WO | WO02080041 A2 | 10/2002 | |
| WO | WO02088888 A2 | 11/2002 | |
| WO | WO02088906 A2 | 11/2002 | |
| WO | WO02093302 A2 | 11/2002 | |
| WO | WO02093328 A2 | 11/2002 | |
| WO | WO02098045 A2 | 12/2002 | |
| WO | WO02099589 A2 | 12/2002 | |
| WO | WO02099601 A2 | 12/2002 | |
| WO | WO02103487 A2 | 12/2002 | |
| WO | WO02103489 A2 | 12/2002 | |
| WO | WO03003150 A2 | 1/2003 | |
| WO | WO03012584 A2 | 2/2003 | |
| WO | WO03012585 A2 | 2/2003 | |
| WO | WO03012586 A2 | 2/2003 | |
| WO | WO03012589 A2 | 2/2003 | |
| WO | WO03032112 A2 | 4/2003 | |
| WO | WO03036432 A2 | 5/2003 | |
| WO | WO03036466 A1 | 5/2003 | |
| WO | WO03038375 A1 | 5/2003 | |
| WO | WO03038547 A2 | 5/2003 | |
| WO | WO03038651 A1 | 5/2003 | |
| WO | WO03038675 A1 | 5/2003 | |
| WO | WO03038676 A1 | 5/2003 | |
| WO | WO03053124 A2 | 7/2003 | |
| WO | WO03062738 A2 | 7/2003 | |
| WO | WO03065278 A1 | 8/2003 | |
| WO | WO03069433 A2 | 8/2003 | |
| WO | WO03069840 A1 | 8/2003 | |
| WO | WO03077054 A2 | 9/2003 | |
| WO | WO03079214 A1 | 9/2003 | |
| WO | WO03087708 A1 | 10/2003 | |
| WO | WO03098516 A1 | 11/2003 | |
| WO | WO03104938 A2 | 12/2003 | |
| WO | WO03104944 A2 | 12/2003 | |
| WO | WO03105054 A1 | 12/2003 | |
| WO | WO2004001537 A2 | 12/2003 | |
| WO | WO2004001538 A2 | 12/2003 | |
| WO | WO2004001544 A2 | 12/2003 | |
| WO | WO2004003699 A2 | 1/2004 | |
| WO | WO2004003811 A1 | 1/2004 | |
| WO | WO2004010262 A2 | 1/2004 | |
| WO | WO2004021102 A2 | 3/2004 | |
| WO | WO2004029781 A2 | 4/2004 | |
| WO | WO2004046989 A2 | 6/2004 | |
| WO | WO2004047082 A2 | 6/2004 | |
| WO | WO2004059547 A1 | 7/2004 | |
| WO | WO2004061596 A2 | 7/2004 | |
| WO | WO2004061785 A2 | 7/2004 | |
| WO | WO2004072778 A2 | 8/2004 | |
| WO | WO2004072803 A2 | 8/2004 | |
| WO | WO2004077256 A2 | 9/2004 | |
| WO | WO2004084028 A2 | 9/2004 | |
| WO | WO2004084046 A2 | 9/2004 | |
| WO | WO2005057458 A1 | 6/2005 | |
| WO | WO2005065131 A2 | 7/2005 | |
| WO | WO2005069871 A2 | 8/2005 | |
| WO | WO2005101996 A2 | 11/2005 | |
| WO | WO2006049779 A1 | 5/2006 | |
| WO | WO2006055117 A2 | 5/2006 | |
| WO | WO2006083709 A2 | 8/2006 | |
| WO | WO2006110121 A1 | 10/2006 | |

| WO | WO2007002065 A2 | 1/2007 |
| WO | WO2007044430 A2 | 4/2007 |
| WO | WO2007059165 A1 | 5/2007 |
| WO | WO2007079228 A2 | 7/2007 |

OTHER PUBLICATIONS

Final Office Action issued for U.S. Appl. No. 11/705,571 mailed on Jul. 13, 2011, 11 pgs.
Office Action issued for U.S. Appl. No. 12/099,253, mailed Aug. 29, 2011, 12 pgs.
Notice of Allowance issued for U.S. Appl. No. 12/030,086, mailed Jul. 26, 2011, 14 pgs.
GasLimit "frequent Asked Questions", obtained from http://wwww.gaslimit.com/faq on Jan. 2, 2008), 2 pgs.
GasLimit "Current Gas prices", obtained from http://www.gaslimit.com/current-gas-prices.php on Jan. 2, 2008, 2 pgs.
GasLimit "Terms and Conditions", obtained from http://www.gaslimit.com/terms_and_conditions on Jan. 2, 2008, 4 pgs.
GasLimit "Quote Steps 1-5", obtained from http://gaslimit.com/legacy on Jan. 2, 2008, 5 pgs.
GasLimit "Gas Cap Cancellation Information", obtained from http://www.gaslimit.com/cancel_info on Jan. 2, 2008, 1 pg.
"Price Changes in the Gasoline Market: Are Midwestern Gasoline Prices Downward Sticky?", Energy Information Administration, Wash., DC; DOE/EIA-0626, pp. i-55, Feb. 2009, 52 pgs.
Jacobson, S. "Recongnizing Embedded Risks in Energy", downloaded from http://www.derivativesstrategy.com/magazine/archive/1999/1299col4.asp on Jan. 11, 2008, 4 pgs.
Gordon et al. Modeling Farm-Retail Price Linkage for Eight Agricultural Commodities (Technical Report #1/96), Dept. of Econ, Univ. of Canada & Auckland, Nov. 1996, 65 pgs.
Ervin, S. Commodity Features Modernization Act of 2000: A Practical Look at the Law that Revolutionized derivatives law and Regulation,: Copyright 2001 Dechert, 5 pgs.
Commodity Features Trading Commission, Order, DOCID:fr21mr03-45; Federal Register, Notices, vol. 68, No. 55, Mar. 21, 2003, obtained from <<wais.access.gpo.gov>>, 6 pgs.
"Congress Makes Changes to the Regulation of Futures and Derivatives Transactions" Publications/McDermott Newsletters, McDermott Will and Emery, Jan. 2001, 10 pgs.
Marsh, J., "Regulation of Specialist Commodity Dealers in the United States", Hunton & Williams, London, England, Oct. 19, 2005, obtained from <<www.hunton.com>>, 10 pgs.
Request for Continued Examination, Extension of Time and Amendment as Filed with the USPTO on Oct. 6, 2006 in U.S. Appl. No. 09/853,196, 17 pgs.
Office Action mailed from USPTO on Dec. 13, 2006 in U.S. Appl. No. 09/805,950, 11 pgs.
Office Action mailed from USPTO on Dec. 15, 2006 in U.S. Appl. No. 09/853,196, 11 pgs.
Asplund, M. et al., "Price Adjustments by a Gasoline Retail Chain", Scand. J. of Economics 102(1), 101-121, 2000, 21 pgs.
Fisher A., "Weather futures 'bet' will give Tucson firms a hedge against losses," Arizona Daily Star, Tucson, Arizona, Feb. 5, 1999, 3 pgs.
Fuel Bank; Lock in your price for gasoline, obtained from http:/www.fuelbank.com on May 19, 2008, 1 pg.
Tommelleo, D., "PRICELINE.COM plans to let Customers Set Prices for Gasoline", The Augusta Chronicle, Augusta, Georgia, Feb. 26, 2000, 2 pgs.
Skyline Products: Central Control Fuel Pricing Software, obtained from http:/skylineproducts.com on Feb. 10, 2007, 3 pgs.
Skyline Products Inc. Press release: Skyline Products Partners with Excentus to Offer a Certified Fuel Pricing Integration for High-Volume Retailers, 1 pg.
International Search Report and Written Opinion for PCT Application No. PCT/US2008/053686, completed May 9, 2008, mailed Jun. 5, 2008, 7 pgs.
International Search Report and Written Opinion for PCT Application No. PCT/US2008/053669, completed May 13, 2008, mailed Jun. 5, 2008, 10 pgs.
International Search Report and Written Opinion for PCT Application No. PCT/US2008/053676, completed May 13, 2008, mailed Jun. 5, 2008, 8 pgs.
International Search Report and Written Opinion for PCT Application No. PCT/US2008/053674, completed May 11, 2008, mailed Jun. 5, 2008, 9 pgs.
International Search Report and Written Opinion for PCT Application No. PCT/US2008/053687, completed May 16, 2008, mailed Jun. 5, 2008, 7 pgs.
Chao et al., "Restructured Electricity Markets: A risk management Approach", [Retrieved online from URL:http//www.ieor.berkeley.edu], presented Jul. 1, 2005, 35 pgs.
International Search Report and Written Opinion for PCT Application No. PCT/US2008/053724, completed May 13, 2008, mailed Jun. 5, 2008, 8 pgs.
International Search Report and Written Opinion for PCT Application No. PCT/US2008/053695, completed May 13, 2008, mailed Jun. 5, 2008, 6 pgs.
International Search Report and Written Opinion for PCT Application No. PCT/US2008/059633, completed Jun. 24, 2008, mailed Jul. 8, 2008, 8 pgs.
International Search Report and Written Opinion for PCT Application No. PCT/US2008/059609, completed Jun. 20, 2008, mailed Jul. 1, 2008, 8 pgs.
International Search Report and Written Opinion for PCT Application No. PCT/US2008/053699, completed May 17, 2008, mailed Jun. 27, 2008, 6 pgs.
International Search Report and Written Opinion for PCT Application No. PCT/US2008/059619, completed Aug. 7, 2008, mailed Aug. 15, 2008, 8 pgs.
International Search Report and Written Opinion for PCT Application No. PCT/US2008/059614, completed Aug. 13, 2008, mailed Aug. 25, 2008, 7 pgs.
Office Action issued for U.S. Appl. No. 12/030,073, mailed May 1, 2009, 11 pgs.
Office Action issued for U.S. Appl. No. 11/705,571, mailed Aug. 14, 2009, 13 pgs.
International Preliminary Report on Patentability for PCT Application No. PCT/US2008/053669, mailed Aug. 27, 2009, issued Aug. 19, 2009, 9 pgs.
International Preliminary Report on Patentability for PCT Application No. PCT/US2008/053676, mailed Aug. 27, 2009, issued Aug. 19, 2009, 6 pgs.
International Preliminary Report on Patentability for PCT Application No. PCT/US2008/053674, mailed Aug. 27, 2009, issued Aug. 19, 2009, 7 pgs.
International Preliminary Report on Patentability for PCT Application No. PCT/US2008/053686, mailed Aug. 27, 2009, issued Aug. 19, 2009, 6 pgs.
International Preliminary Report on Patentability for PCT Application No. CT/US2008/053687, mailed Aug. 27, 2009, issued Aug. 19, 2009, 6 pgs.
International Preliminary Report on Patentability for PCT Application No. PCT/US2008/053695, mailed Aug. 27, 2009, issued Aug. 19, 2009, 5 pgs.
International Preliminary Report on Patentability for PCT Application No. PCT/US2008/053699, mailed Aug. 27, 2009, issued Aug. 19, 2009, 5 pgs.
International Preliminary Report on Patentability for PCT Application No. PCT/US2008/053724, mailed Aug. 27, 2009, issued Aug. 19, 2009, 6 pgs.
International Preliminary Report on Patentability issued for PCT/US2008/059633, issued Oct. 13, 2009, mailed Oct. 22, 2009.
International Preliminary Report on Patentability issued for PCT/US2008/059619, issued Oct. 13, 2009, mailed Oct. 22, 2009.
International Preliminary Report on Patentability issued for PCT/US2008/059609, issued Oct. 13, 2009, mailed Oct. 22, 2009.
International Preliminary Report on Patentability issued for PCT/US2008/059614, issued Oct. 13, 2009, mailed Oct. 22, 2009.
Final Office Action issued for U.S. Appl. No. 12/030,073 mailed Nov. 24, 2009.
Office Action issued for U.S. Appl. No. 12/370,430 mailed Jan. 20, 2010, 14 pgs.

Final Office Action issued for U.S. Appl. No. 11/705,571 mailed Apr. 23, 2010, 16 pgs.
Office Action issued for U.S. Appl. No. 12/099,237 mailed May 21, 2010, 8 pgs.
Office Action issued for U.S. Appl. No. 12/099,253 mailed May 25, 2010, 9 pgs.
Office Action issued for U.S. Appl. No. 12/099,224 mailed May 26, 2010, 7 pgs.
Office Action issued for U.S. Appl. No. 12/029,961 mailed Jun. 23, 2010, 13 pgs.
Final Office Action issued for U.S. Appl. No. 12/370,430 mailed Jul. 7, 2010, 13 pgs.
Office Action issued for U.S. Appl. No. 12/030,012, mailed Jul. 22, 2010, 12 pgs.
Office Action issued for U.S. Appl. No. 12/099,209, mailed Aug. 3, 2010, 17 pgs.
Office Action issued for U.S. Appl. No. 12/030,032, mailed Sep. 28, 2010, 9 pgs.
Office Action issued for U.S. Appl. No. 12/370,395, mailed Oct. 7, 2010, 11 pgs.
Office Action issued for U.S. Appl. No. 12/099,253 mailed Oct. 26, 2010, 10 pgs.
Office Action issued for U.S. Appl. No. 12/030,119 mailed Oct. 27, 2010, 16 pgs.
TechWeb, "Bargain Hunters Topple AAA Gas-Price Finder," Manhasset, May 27, 2005, (1 pg.).
Shanley, Will, "Drivers can Use the Internet to Find Cheap Gasoline," Knight Ridder Tribune Business News, Washington, May 26, 2005, (1 pg.).
Day to Day, "Using the Internet to Search for Cheap Gas," Los Angeles, Apr. 27, 2006, (1 pg.).
Maunsell, Nevill Boyd, "City View: Savers and Borrowers Hang on to Shares," Birmingham Post, Post Edition, Birmingham (UK, Nov. 30, 2000, (1 pg.)
Office Action issued for U.S. Appl. No. 12/099,237, mailed on Nov. 10, 2010, 7 pgs.
Office Action issued for U.S. Appl. No. 12/030,086, mailed Dec. 21, 2010, 13 pgs.
Liu, Lon-Mu, "Dynamic Relationship Analysis of US Gasoline and Crude Oil Prices," Journal of Forecasting, Sep. 1991, p. 521-547. (27 pgs.).
John M. Barron, Beck A. Taylor and John R. Umbeck, "Will Open Supply Lower Retail Gasoline Prices?" Contemporary Economic Policy, Jan. 2004, pp. 63-77. (15 pgs).
Franklin R. Edwards and Michael S. Carter, "The Collapse of Metallgesellschaft: Unhedgeable Risks, Poor Hedging Strategy, or Just Bad Luck?" The Journal of Futures Markets, May 1995, p. 211. (54 pgs.).
Office Action issued for U.S. Appl. No. 12/029,961, mailed Nov. 17, 2010, 15 pgs.
Office Action issued for U.S. Appl. No. 12/030,041, mailed Nov. 16, 2010, 14 pgs.
Office Action issued for U.S. Appl. No. 12/370,430, mailed Jan. 13, 2011, 15 pgs.
Office Action issued for U.S. Appl. No. 12/099,209, mailed Jan. 20, 2011, 19 pgs.
Office Action issued for U.S. Appl. No. 12/099,224, mailed Nov. 12, 2010, 8 pgs.
Office Action issued for U.S. Appl. No. 11/705,571, mailed Jan. 26, 2011, 20 pgs.
Roger G. Clarke, "Options and Futures: A Tutorial," The Research Foundation of the Institute of Chartered Financial Analysis, Dec. 1992/Rev. Aug. 1996, 46 pgs.
Phil Shook, "Futures Trading: The Fine Art of Managing Risk, or Shooting," NPN, National Petroleum News, Chicago: Feb. 1992, vol. 84, Issue 2, p. 37, 7 pgs.
Notice of Allowance issued for U.S. Appl. No. 12/099,224, mailed Mar. 1, 2011, 5 pgs.
Notice of Allowance issued for U.S. Appl. No. 12/099,237, mailed Mar. 3, 2011, 5 pgs.
"Locked-in rates for heating oil burn consumers," David Dishneau Associated Press, Journal-Gazette, Ft. Wayne, Inc. Oct. 11, 2006, 3 pgs.
"Fuel hardy as gas and oil prices rise, shoppers can place a premium on the pennies they save by using their heads at the pump," Kristen Andresen, Bangor Daily News, Bangor, ME, Oct. 1, 2005, 3 pgs.
Office Action for U.S. Appl. No. 12/030,041, mailed Apr. 12, 2011, 19 pgs.
Office Action for U.S. Appl. No. 12/370,395, mailed Apr. 13, 2011, 12 pgs.
Office Action issued for U.S. Appl. No. 12/029,961, mailed May 12, 2011, 14 pgs.
Office Action issued for U.S. Appl. No. 12/030,032, mailed May 23, 2011, 10 pgs.
Office Action issued for U.S. Appl. No. 13/076,567, mailed May 24, 2011, 6 pgs.
Final Office Action issued for U.S. Appl. No. 12/370,430, mailed Jun. 1, 2011, 16 pgs.
Office Action issued for U.S. Appl. No. 13/210,602, mailed Oct. 11, 2011, 7 pgs.

* cited by examiner

| | DAY 1 | MONTH 1 | MONTH 2 | MONTH 3 | MONTH 4 | MONTH 5 | MONTH 6 | |
|---|---|---|---|---|---|---|---|---|
| 414 — DEFINED INDEX | $2.38 | $2.45 | $2.50 | $2.60 | $2.75 | $2.95 | $3.10 | |
| 412 — RETAIL PRICE AT PUMP | $2.42 | $2.48 | $2.58 | $2.68 | $2.80 | $3.10 | $3.20 | |
| 416 — LOCK PRICE | $2.48 | $2.48 | $2.48 | $2.48 | $2.48 | $2.48 | $2.48 | |
| 418 — EXERCISE PRICE | $2.58 | $2.58 | $2.58 | $2.53 | $2.53 | $2.48 | $2.48 | |
| EXERCISE? | | NO | NO | YES | YES | YES | YES | |
| HEDGE COST PER GALLON TO FINANCIAL INSTITUTION PARTNER | $0.36 | | | | | | | |
| # GALLONS PREPAID | 100 | | | | | | | |
| TOTAL PREPAYMENT | $284.00 | | | | | | | |
| VALUE OF VIRTUAL TANK | $248.00 | | | | | | | |
| | | | | | | | | TOTAL |
| 422 — GALLONS FILLED UP AT PUMP | | 15 | 17 | 15 | 20 | 25 | 40 | 132 |
| VIRTUAL TANK GALLONS DEPLETION | | 0 | 0 | 15 | 20 | 25 | 40 | 100 |
| VIRTUAL TANK $$ DEPLETION | | $0.00 | $0.00 | $37.20 | $49.60 | $62.00 | $99.20 | $248.00 |
| PRICELOCK (PL) PAYMENT TO MERCHANT | | $0.00 | $0.00 | $39.00 | $55.00 | $73.75 | $124.00 | $291.75 |
| 420 — BASIS RISK PAID BY CONSUMER (PAID TO MERCHANT) | | | | $1.20 | $1.00 | $3.75 | $4.00 | $9.95 |
| BENEFIT OF LOWER PRICE TO CONSUMER (PAID BY PL) | | $0.00 | $0.00 | $0.00 | $0.00 | $0.00 | $0.00 | $0.00 |
| FINANCIAL INSTITUTION PARTNER'S PAYMENT TO PL | | $0.00 | $0.00 | $1.80 | $5.40 | $11.75 | $24.80 | $43.75 |
| PL REBATE TO CUSTOMER (SPREAD FROM INDEX TO RETAIL) | | $0.00 | $0.00 | $0.00 | $0.00 | $0.00 | $0.00 | $0.00 |
| TOTAL COST TO CONSUMER WITH RCPPP (EXERCISE) | $293.95 | | | | | | | |
| TOTAL COST TO CONSUMER WITH RCPPP (NO EXERCISE) | $301.70 | | | | | | | |
| TOTAL COST TO CONSUMER WITHOUT RCPPP | $382.76 | | | | | | | |

*FIG. 4*

SYSTEM AND METHOD FOR CONSTRAINING DEPLETION AMOUNT IN A DEFINED TIME FRAME

RELATED INFORMATION

This application is a continuation of, and claims a benefit of priority under 35 U.S.C. 120 of the filing date of U.S. patent application Ser. No. 12/099,237, entitled "SYSTEM AND METHOD FOR CONSTRAINING DEPLETION AMOUNT IN A DEFINED TIME FRAME," filed on Apr. 8, 2008, now U.S. Pat. No. 7,945,501 by Fell et al.; which in turn claims priority to U.S. Provisional Patent Application No. 60/922,488, entitled "SYSTEM AND METHOD FOR CONSTRAINING DEPLETION AMOUNT IN DEFINED TIME PERIOD," filed on Apr. 9, 2007, by Fell et al.; and to U.S. Provisional Patent Application No. 60/922,520, entitled "SYSTEM AND METHOD FOR CONSTRAINING EFFICIENT EXERCISE FRONTIER," filed on Apr. 9, 2007, by Fell et al. This application relates to U.S. patent application Ser. No. 11/705,571, entitled "METHOD AND SYSTEM FOR PROVIDING PRICE PROTECTION FOR COMMODITY PURCHASING THROUGH PRICE PROTECTION CONTRACTS," filed on Feb. 12, 2007, by Fell et al. All of which are incorporated herein as if set forth in full.

TECHNICAL FIELD OF THE DESCRIPTION

Embodiments of the disclosure relate generally to retail commodity transactions and more particularly to systems and methods related to retail commodity transactions which can encourage the consumer to purchase the commodity more uniformly over time.

BACKGROUND

Many commodities fluctuate in price on a regular basis. The volatility of these fluctuations depends heavily on a variety of factors, including supply and demand, or variables associated with the supply and demand. Disruptions in the supply of these commodities such as those caused by world events, natural disasters, etc. may cause their price to change markedly in a relatively short amount of time. These price changes can be quite noticeable, as commodities tend to be extensively consumed and fluctuations in the price of such commodities may occur relatively rapidly.

The severity of the effects of these commodity price changes may be tied directly to the amount consumed. Take gasoline as an example. While individual consumers are certainly affected by spikes in gasoline prices, these effects may be even more pronounced with regard to large purchasers of gasoline. More specifically, large purchasers such as businesses which rely on a fleet of vehicles to conduct their day-to-day operations may be severely financially strained by an increase in the price of gasoline. Thus, relatively frequent fluctuations in price can make anticipating future expenses for a commodity very difficult, creating budgeting and accounting issues for large purchasers of the commodity.

There are currently a variety of schemes through which commodities can be purchased. In the case of motor fuel, one example scheme is a fuel card. A consumer may purchase a fuel card that carries a certain monetary value. Whenever the fuel card is used to purchase motor fuel at a retail point-of-sale location, the purchase price is subtracted from the value of the fuel card. With a fuel card, the consumer may still pay at the retail price for the motor fuel. Thus, this motor fuel purchasing scheme does not necessarily protect the consumer from adverse price fluctuations.

Some purchasing schemes have been introduced in certain industry segments in an effort to address this issue. For example, there are certain schemes which allow a consumer to purchase a good or service and take later delivery, in whole or in part, such as purchasing a quantity of motor fuel which is physically deposited in a storage tank for future at will consumption. The physical product itself has to be ordered and deposited into a storage facility, which has a limited capacity.

Other schemes have been introduced whereby an individual consumer or a business consumer such as a fleet manager may purchase a quantity of motor fuel at the then prevailing retail price such that an account associated with the consumer is credited with the amount purchased. At this point, the motor fuel has not actually been delivered but a quantity is held on reserve that can be redeemed in part or in whole at a variety of locations. However, the consumer has to pay for the entire amount in advance and is committed to the quantity of the motor fuel thus pre-purchased.

SUMMARY OF THE DESCRIPTION

Embodiments of the present disclosure provide systems and methods for providing price protection for retail commodity purchases that eliminate, or at least substantially reduce, the shortcomings of prior art systems and methods for providing price protection for retail commodity purchases.

Systems and methods for the provisioning of price protection contracts which provide price protection to a consumer against adverse fluctuations in the retail price of a commodity are disclosed. While these price protection contracts may pertain to almost any type of commodity, embodiments of the present invention may provide systems and method for allowing a consumer to obtain price protection on the purchase of motor fuel. Specifically, embodiments of the present invention may provide the ability for consumers to obtain a price protection contract for the purchase of motor fuel where the price protection contract specifies at least one lock price, quantity, locale or delivery time frame such that if the retail price of fuel goes above the lock price in the locale, the consumer may purchase at the lock price at any of a number of associated retail point-of-sale locations within the locale, otherwise the consumer may purchase at the then prevailing retail price. In some embodiments, purchasing motor fuel may mean taking delivery of motor fuel from a pre-purchased virtual reserve while in some embodiments purchasing motor fuel may mean paying for the motor fuel (from an account at a price protection service provider) and taking delivery of the motor fuel. The price protection contract may guarantee (for the delivery time frame) the right to aggregately purchase the quantity of fuel in the locale at the lock price. The price protection contract can include a depletion constraint which obligates the consumer to purchase at least some of the price protected commodity within a predefined time frame.

In many embodiments, the consumer can select the depletion constraint and obtain a price protection contract price that is adjusted based on the selected depletion constraint. In some embodiments, the depletion constraint can be linear. The consumer can be required to guarantee that the consumer will purchase a certain amount of the commodity during the delivery time frame. In various embodiments, a provider of the price protection contract has a right to receive a payment from the consumer when the retail price of the commodity at the time of the purchase is below a floor price. The provider may also receive a strike price matrix (on which terms of the contract can be based) from a financial institution and adjusted based on the depletion constraint. In some embodiments, the commodity is motor fuel.

Embodiments provide numerous advantages over previously available systems and methods related to retail commodity purchases. Some embodiments provide price protection to consumers for retail commodity purchases. Some embodiments provide commodity price predictability for consumers. Various embodiments allow providers of price protection services to predict when price protected purchases will occur. Embodiments which provide purchase predictability can lower insurance costs associated with the price protection services. Many embodiments provide retail commodity price protection against low prices for providers of price protection services.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the disclosure, and the disclosure includes all such substitutions, modifications, additions, or rearrangements.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein:

FIG. 4 presents a table illustrating aspects of price protection services implemented by some embodiments.

DETAILED DESCRIPTION

Figure 1:
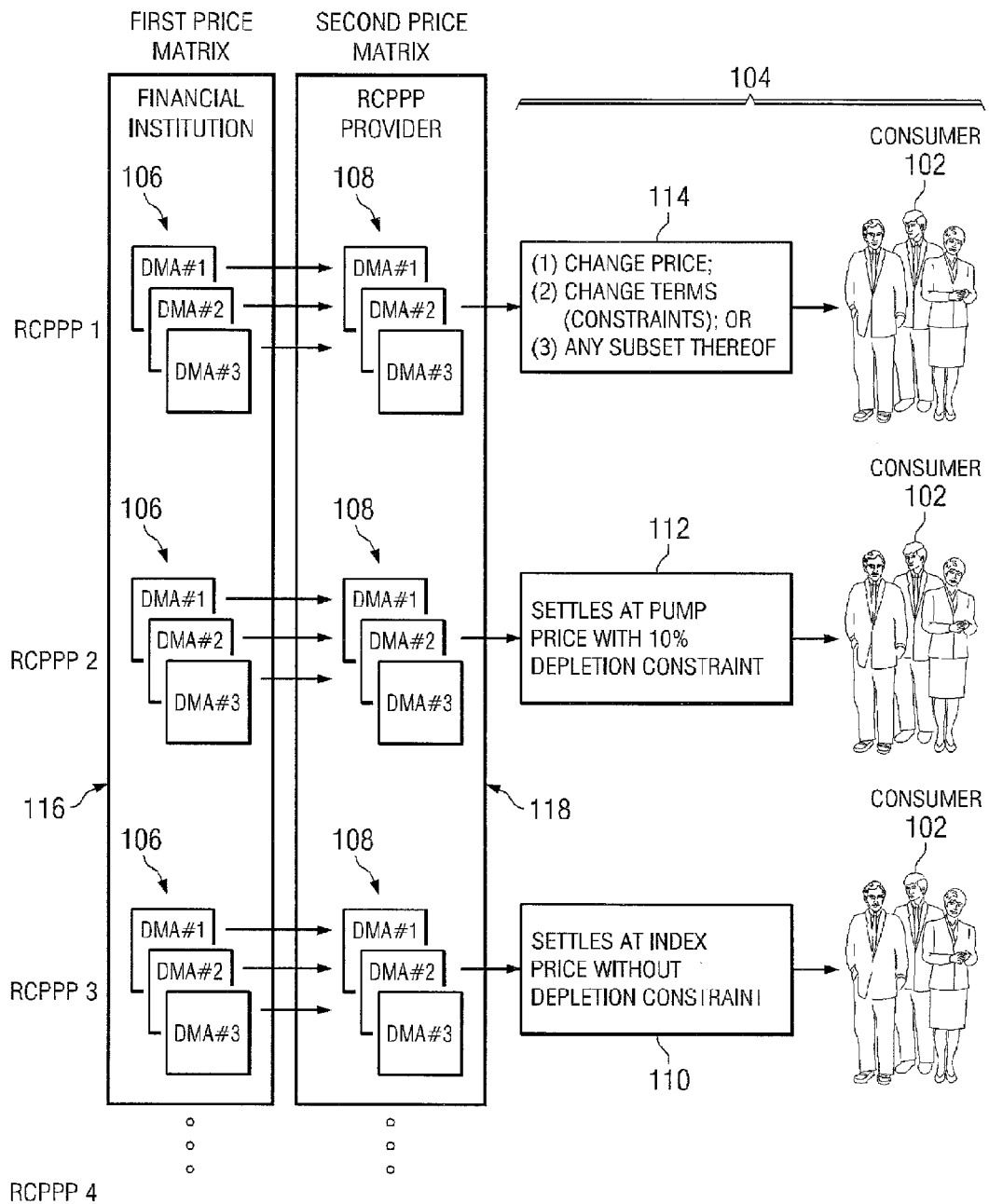
FIG. 1 is a block diagram schematically illustrating methods of settling retail commodity price protection contracts implemented by some embodiments.

Various embodiments of the disclosure are illustrated in the FIGURES, like numerals generally being used to refer to like and corresponding parts of the various drawings. Embodiments of the disclosure provide systems and methods related to retail commodity transactions which can encourage consumers to purchase the price protected commodity more predictably over time.

Within this disclosure, the term "commodity" refers to an article of commerce—an item that can be bought and sold freely on a market. It may be a product which trades on a commodity exchange or spot market and which may fall into one of several categories, including energy, food, grains, and metals. Currently, commodities that can be traded on a commodity exchange include, but are not limited to, crude oil, light crude oil, natural gas, heating oil, gasoline, propane, ethanol, electricity, uranium, lean hogs, pork bellies, live cattle, feeder cattle, wheat, corn, soybeans, oats, rice, cocoa, coffee, cotton, sugar, gold, silver, platinum, copper, lead, zinc, tin, aluminum, titanium, nickel, steel, rubber, wool, polypropylene, and so on. Note that a commodity can refer to tangible things as well as more ephemeral products. Foreign currencies and financial indexes are examples of the latter. For example, positions in the Goldman Sachs Commodity Index (GSCI) and the Reuters Jefferies Consumer Research Board Index (RJCRB Index) can be traded as a commodity. What matters is that something be exchanged for the thing. New York Mercantile Exchange (NYMEX) and Chicago Mercantile Exchange (CME) are examples of a commodity exchange. Other commodities exchanges also exist and are known to those skilled in the art.

In a simplified sense, commodities are goods or products with relative homogeneousness that have value and that are produced in large quantities by many different producers; the goods or products from each different producer are considered equivalent. Commoditization occurs as a goods or products market loses differentiation across its supply base. As such, items that used to carry premium margins for market participants have become commodities, of which crude oil is an example. However, a commodity generally has a definable quality or meets a standard so that all parties trading in the market will know what is being traded. In the case of crude oil, each of the hundreds of grades of fuel oil may be defined. For example, West Texas Intermediate (WTI), North Sea Brent Crude, etc. refer to grades of crude oil that meet selected standards such as sulfur content, specific gravity, etc., so that all parties involved in trading crude oil know the qualities of the crude oil being traded. Motor fuels such as gasoline represent examples of energy-related commodities that may meet standardized definitions. Thus, gasoline with an octane grade of 87 may be a commodity and gasoline with an octane grade of 93 may also be a commodity, and they may demand different prices because the two are not identical—even though they may be related. Those skilled in the art will appreciate that other commodities may have other ways to define a quality. Other energy-related commodities that may have a definable quality or that meet a standard include, but are not limited to, diesel fuel, heating oils, aviation fuel, and emission credits. Diesel fuels may generally be classified according to seven grades based in part on sulfur content, emission credits may be classified based on sulfur or carbon content, etc.

Historically, risk is the reason exchange trading of commodities began. For example, because a farmer does not know what the selling price will be for his crop, he risks the margin between the cost of producing the crop and the price he achieves in the market. In some cases, investors can buy or sell commodities in bulk through futures contracts. The price of a commodity is subject to supply and demand.

A commodity may refer to a retail commodity that can be purchased by a consuming public and not necessarily the wholesale market only. One skilled in the art will recognize that embodiments disclosed herein may provide means and mechanisms through which commodities that currently can only be traded on the wholesale level may be made available to retail level for retail consumption by the public. One way to achieve this is to bring technologies that were once the private reserves of the major trading houses and global energy firms down to the consumer level and provide tools that are applicable and useful to the retail consumer so they can mitigate and/or manage their measurable risks involved in buying/selling their commodities. One example of an energy related retail commodity is motor fuels, which may include various grades of gasoline. For example, motor fuels may include 87 octane grade gasoline, 93 octane grade gasoline, etc as well as various grades of diesel fuels. Other examples of an energy related retail commodity could be jet fuel, heating oils, electricity or emission credits such as carbon offsets. Other retail commodities are possible and/or anticipated.

While a retail commodity and a wholesale commodity may refer to the same underlying good, they are associated with risks that can be measured and handled differently. One reason is that, while wholesale commodities generally involve sales of large quantities, retail commodities may involve much smaller transaction volumes and relate much more closely to how and where a good is consumed. The risks associated with a retail commodity therefore may be affected by local supply and demand and perhaps different factors. Within the context of this disclosure, there is a definable relationship between a retail commodity and the exposure of risks to consumer. This retail level of the exposure of risks may correlate to the size and the specificity of the transaction in which the retail commodity is traded. Other factors may include the granularity of the geographic market where the transaction takes place, and so on. Within this disclosure, a geographic boundary may be defined as a city, a borough, a county, a state, a country, a region, a zip code, or other predetermined area, or may be arbitrarily defined as a designated market area (DMA), or some combination or division. For example, the demand for heating oil No. 2 in January may be significantly different in the Boston market than in the Miami market.

Before discussing specific embodiments, an embodiment of a hardware architecture for implementing certain embodiments is described herein. One embodiment can include a computer communicatively coupled to a network (the Internet in some embodiments). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Prices for retail commodities can fluctuate due to a variety of factors. One way to protect consumers from adverse price fluctuations of a retail commodity is to make available to them retail commodity price protection contracts, also referred to herein as retail commodity price protection products (RCPPPs). Consumers can be fleet consumers, consumers with several vehicles, household consumers, etc. In some embodiments, the commodity may be various types of motor fuel. As one of ordinary skill in the art can appreciate, embodiments can be adapted or otherwise implemented for other retail commodities.

According to some embodiments, the ability of consumers to exercise their rights (under a price protection contract) to take delivery of the price protected commodity (thereby depleting the balance of the price protected commodity associated with the accounts of the consumers) can be constrained in various ways. Depletion constraints can include volume based constraints, purchase price based constraints, time based constraints, duration based constraints, etc. Some embodiments implement depletion constraints which involve obligating consumers to take delivery of up to a predefined portion of the price protected commodity within a predefined portion of the delivery time frame. Some depletion constraints involve more than one predefined portion of the delivery time frame and, correspondingly, more than one predefined portion of the commodity. In some embodiments, depletion constraints can be linear in nature with delivery of the same quantity of the commodity required during each portion of the delivery time frame. As one of ordinary skill in the art can appreciate, other types of depletion constraints are also possible such as time varying depletion constraints. In some embodiments, price protection service providers may impose depletion constraints unilaterally, change depletion constraints, or allow consumers 102 to choose depletion constraints. To entice consumers to choose depletion constraints, price protection service providers can offer incentives to consumers.

FIG. 1 schematically illustrates embodiments implementing depletion constraints associated with RCPPPs. FIG. 1 shows consumers 102, RCPPPs in general 104, strike price matrix 106, lock price matrix 108, certain RCPPPS 110, 112, and 114, financial institution 116, and RCPPP provider 118.

As disclosed in U.S. patent application Ser. No. 11/705,571, entitled "Method And System For Providing Price Protection For Commodity Purchasing Through Price Protection Contracts," filed on Feb. 12, 2007, by Fell et al., which is incorporated herein as if set forth in full, financial institution 116 can provide to RCPPP provider 118 strike price matrix 106 which can define 1) commodity hedge positions, 2) associated commodity prices at which financial institution 116 may be willing to provide the commodity to RCPPP provider 118, and 3) hedge costs for various grades of a commodity.

RCPPP provider 118 can use strike price matrix 106 to create various RCPPPs 104 such as price protection contracts with, or without, depletions constraints. Various RCPPPs 110, 112, and 114 can allocate the risk of adverse price fluctuations differently between consumers 102 and RCPPP provider 118. In some embodiments, RCPPP 110 can be a price protection contract in which consumers 102 settle commodity purchases against the index price without a depletion constraint. In some embodiments, RCPPP 112 can be a price protection contract in which consumers 102 settle commodity purchases against a retail price with a 10% depletion constraint. RCPPP 114 can be a modifiable price protection contract in which RCPPP provider 118 can unilaterally (or in conjunction with consumers 102) change commodity price related terms, can change depletion constraint related terms, and can change any combination of terms in RCPPP 104.

In some embodiments, RCPPP 104 for motor fuel purchases may specify at least one lock price, quantity, locale, or delivery time frame or period. According to the contract, consumer 102 can purchase the motor fuel (and other products and services) at the lock price at any of a number of retail point-of-sale (POS) locations such as gas stations, truck stops, fleet terminals, pumps, etc. within the locale if the retail price of motor fuel goes above the lock price. Otherwise, motor fuel may be purchased at the then prevailing retail price. This practice can be referred to as pump price settlement according to which the purchase is settled with consumer 102 against the lock price and the retail price. Transactions to obtain RCPPPs 104 can take place in many ways and through various channels such as via Websites, online stores, brick-and-mortar locations, sales agents, etc. Locales can correspond to countries, states, cities, metropolitan areas, zip codes, counties, area codes, designated market areas (DMA), etc. In some embodiments, a locale can include areas where consumer 102 may receive similar offerings, prices, deals, etc. for quantities of motor fuel.

When RCPPP 104 is formed, a virtual reserve can be created which corresponds to the balance of consumer's 102 account. When, in one embodiment, consumer 102 accepts RCPPP 104 for 200 gallons of motor fuel the account balance (and, hence, the virtual reserve) contains the equivalent of 200 gallons of motor fuel of which consumer 102 can take delivery. Virtual reserves can be depleted by an amount corresponding to the amount of the fuel purchased by consumers 102. In various embodiments, the unit of depletion can be gallons, liters, pounds, tons, kilograms (or other units of volume, weight, or mass), dollars, euros, francs, pounds (or other units of currency), days, weeks, months, years (or other units of time), etc.

In some embodiments, price protected retail purchases can be settled against a defined index. Defined indices can be published by government agencies, non-profit organizations, business entities, independent third parties, or the like. In some embodiments, the defined index is the weekly national index of retail gasoline prices published by the Department of Energy (DOE). Other indices, including city-based indices, state-based indices, proprietary indices, national indices, global indices, etc., can be utilized or combined to generate custom indices.

In some embodiments, consumers 102 can choose exercise prices at which they may purchase the commodity when the retail price rises above the exercise price. Exercise prices may equal or exceed the lock price and provide RCPPP provider 118 protection against price fluctuations above the lock price but below the exercise price. Since consumers 102 assume the risk of such price fluctuations by accepting an exercise price, consumers 102 can be given incentives to select an exercise price. Examples of incentives may include reduced RCPPP 104 purchase prices. Purchasing at the exercise price can be made optional for consumers 102. Some embodiments enable consumers 102 to adjust their exercise prices during the delivery time frame. In some embodiments, exercise prices provide consumers 102 with additional flexibility in managing the depletion of their virtual reserves. RCPPPs 104 of some embodiments may set a default exercise price equal to the lock price.

Figure 2:
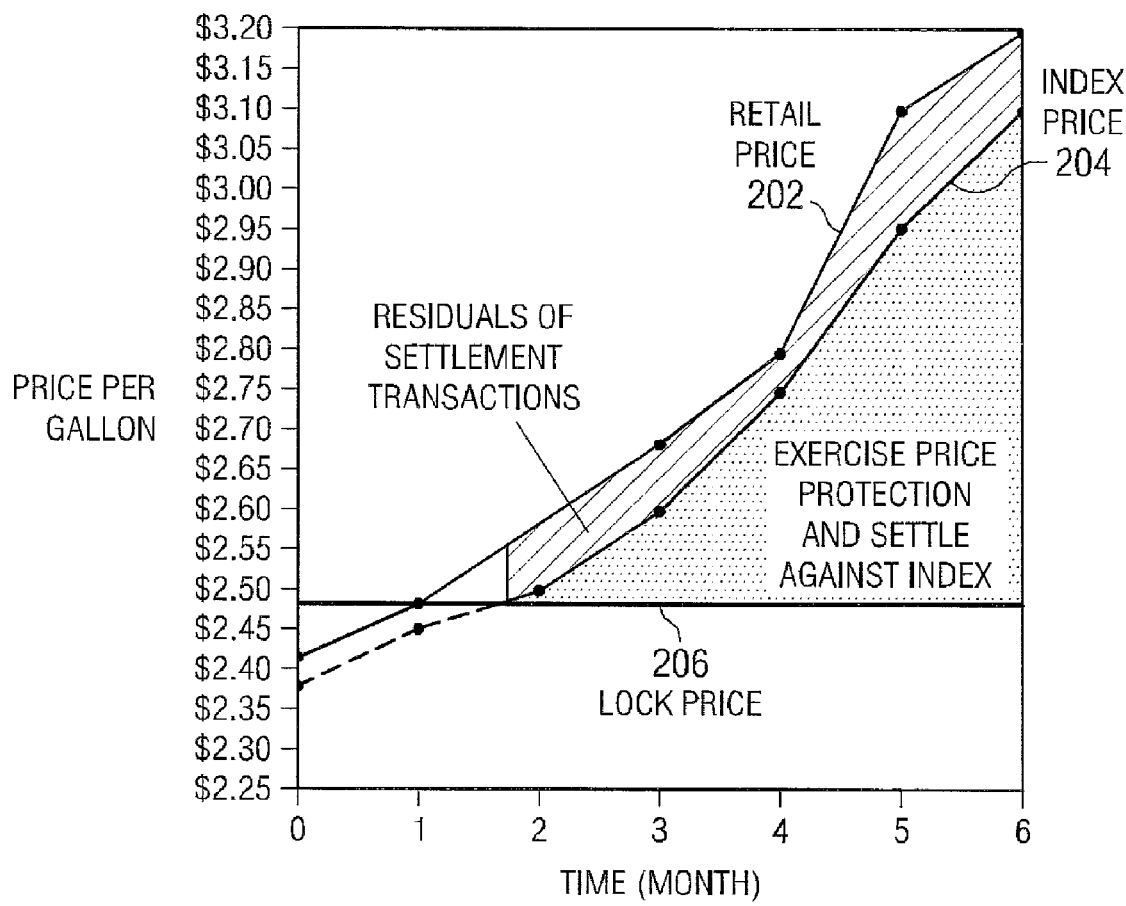
FIG. 2 presents graphs illustrating aspects of price protection services implemented by some embodiments.
Figure 3:
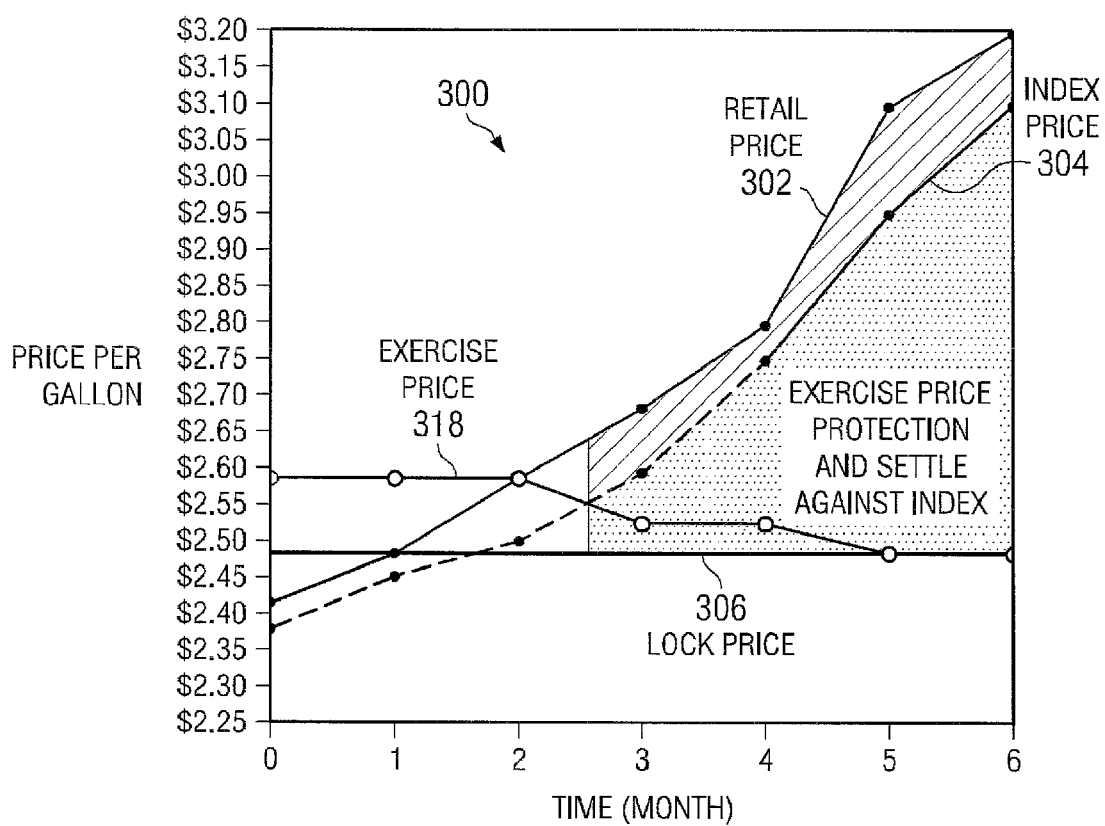
FIG. 3 presents graphs illustrating aspects of price protection services implemented by some embodiments.

FIGS. 2 and 3 illustrate some aspects of embodiments implementing RCPPPs 104 without exercise prices (see FIG. 2) and with exercise prices (see FIG. 3). FIG. 2 illustrates graph 200 including retail price plot 202, index price plot 204, and lock price plot 206 as measured against price along the vertical axis and against time (from the beginning of a delivery time frame) along the horizontal axis. As retail price plot 202 shows, motor fuel prices may increase although they may also remain steady, decrease, fluctuate, spike, dip, etc. Index price plot 204 can generally track retail price plot 202 although the two plots 202 and 204 may exhibit lags, leads, divergence, convergence, etc with respect to each other. Lock price plot 206 can remain constant throughout a delivery time frame although lock price plot 206 can vary as desired. In the absence of RCPPPs 104, consumers 102 can purchase motor fuel at the retail price according to retail price plot 202. Without RCPPPs 104, consumers 102 have little ability to respond to varying retail prices other than adjusting their consumption patterns.

Consumers 102 having RCPPPs 104 can purchase motor fuel according to retail price plot 202 or can decide whether to exercise their rights to purchase motor fuel according to lock price plot 206. During times when the retail price remains below the lock price, price protected consumers 102 will probably choose to purchase at the retail price. When the retail price exceeds the lock price, price protected consumers 102 will probably decide to purchase at the lock price and save the difference between the retail price and the lock price. For price protected consumers 102 subject to index based RCPPP 104 settlements, a similar analysis may apply in that the difference between the index price and the lock price can determine whether price protected consumers 102 will probably purchase motor fuel at the index price or at the lock price.

With reference now to FIG. 3, some embodiments implement RCPPPs 104 with exercise prices. Variations in exercise price plot 208 illustrates that consumer 102 can adjust the exercise price in some embodiments. FIG. 3 also shows that consumers 102 can adjust the exercise price down to the lock price. Price protected consumers 102 who choose to select an exercise price can have the right to choose between purchasing motor fuel at the retail price or at their exercise price according to plots 302 and 318. When their exercise price is below the retail price, consumers 102 will probably choose to purchase at the lower retail price. When the retail price exceeds their exercise price, price protected consumers 102 will probably choose to purchase the commodity at the lower exercise price. Index based RCPPPs 104 can be combined with RCPPPs 104 having exercise prices such that plots 304 and 318 illustrate probable consumer 102 purchasing decisions.

With continued reference to FIGS. 2 and 3, a scenario can illustrate the choices consumers 102 can make as motor fuel prices fluctuate. In one scenario, consumer 102 purchases RCPPP 104 for 200 gallons of motor fuel at a lock price of $2.48 per gallon. Consumer 102 of the current scenario now has an account balance, which can be referred to as a virtual reserve, of 200 gallons of gasoline. The points where plots 202, 204, 302, and 304 intersect the price axis of FIGS. 2 and 3 (at time zero) illustrate the initial conditions of the current scenario. The initial index price on the first day of the delivery time frame is $2.38, the initial retail price is $2.42 and consumer 102 can choose an exercise price at some differential over the index price such as initial index price $2.58 ($0.20 over the index price). So long as the index price remains lower than the exercise price, consumer 102 can choose to forego purchasing the commodity under RCPPP 104. In this situation, consumer's 102 virtual reserve is not depleted.

In the current scenario, one month into the delivery time frame the index price increases to $2.45 and the retail price increases to $2.48 as shown by plots 304 and 302 respectively. Since the index price of $2.45 remains below the exercise price of $2.58, consumer 102 may continue to avoid depleting their virtual reserve by refraining from purchasing the commodity under the terms of RCPPP 104. Two months from the beginning of the delivery time frame of the current scenario, the index price increases to $2.50 and the retail price increases to $2.58. In this situation, consumer 102 can still avoid depleting their virtual reserve since the index price of $2.50 remains less than the exercise price of $2.58. Three months from the beginning of the delivery time frame, in the current scenario, the index price increases to $2.60 and the retail price increases to $2.68. With the index price exceeding the exercise price, consumer 102 will probably exercise the right to purchase the commodity at the lower exercise price. The transaction can be settled against the index and consumers' 102 virtual reserve can be depleted by the amount of gasoline purchased.

FIG. 4 presents a table summarizing the current scenario and exemplifies some aspects of various embodiments. Some of the numeric data shown in FIG. 4 corresponds to plots 202, 204, 206, 208, 302, 304, 306, and 318 of FIGS. 2 and 3. FIG. 4 shows that in transactions settled against index prices 114, consumers 102 can assume some of the basis risk associated with RCPPPs 104 that might otherwise be assumed by RCPPP provider 118. In the current scenario, consumer 102 purchases 15 gallons of motor fuel in the third month under the terms of an index based RCPPP. At that time, index price 412 of $2.60 is higher than exercise price 418 of $2.53. In this situation, consumer 102 would likely purchase the motor fuel under the terms of RCPPP 104. Consumer's 102 virtual reserve 422 could be depleted by a corresponding amount (15 gallons) and account balance or virtual reserve 422 could be reduced by the corresponding price of $37.20 (lock price 416 of $2.48 per gallon multiplied by 15 gallons). RCPPP provider 118 could pay the merchant $39.00 (the index price of $2.60 per gallon multiplied by the purchased amount of 15 gallons) from consumers' 102 account. According to the terms of the scenario illustrated by FIG. 4, consumer 102 can be responsible for the difference between retail price 412 and index price 414 which, in this case, is $1.20 ($0.08 per gallon multiplied by 15 gallons). The difference between the amount paid by consumer 102 and the amount charged by the retailer (at the retail price) can be referred to as residuals 420 of the transaction settlement as illustrated by FIG. 4. FIG. 4 illustrates that RCPPP 104 can provide price protection up to index price 414 and that consumer 102 can assume some basis risk 420 when purchasing gas at retail prices 412 above defined index price 414. The type of transaction illustrated by the current scenario can be referred to as settling against index price 414.

In some scenarios, a population of price protected consumers 102 might be subject to the same index price 414 but the individual consumers 102 in the population might have selected different exercise prices. It is also possible that, during a certain time frame, individual consumers 102 purchase motor fuel subject to many different retail prices 412. The set of purchases might therefore have occurred along a continuum of retail prices 412 and exercise prices 416. Some of retail prices 412 may have exceeded common index price 414 or fallen short of the common index price 414. For purchases which exceeded index price 414, individual consumers 102 may be charged the difference between the inflated retail price and index price 414 to discourage them from making such purchases.

For purchases at discounted retail prices, RCPPP provider 118 can transfer only the amount of funds necessary to cover the purchase at the discounted retail price. This practice contrasts with situations in which a purchase occurred at a retail price equal to or greater than index price 414 in which RCPPP provider 118 transfers to the retailer only an amount corresponding to purchasing at index price 414. For purchases involving a discounted retail price, the difference between index price 414 and the discounted retail price can be retained by RCPPP provider 118. In some embodiments, the difference can be returned to, or shared with, consumer 102 who purchased motor fuel at the discounted retail price to provide an incentive to consumer 102 to seek out discounted retail prices.

Consumers 102, in some embodiments, may choose to take delivery of their entire virtual reserves immediately, at some intermediate time during the delivery time frame, wait until the last day of the delivery time frame, their virtual reserve gradually over time, or never take delivery of even a portion of their virtual reserves. Their choice may depend on many factors including the cost of RCPPP 104, the retail price of the motor fuel, the lock price, the index price, consumers' 102 anticipated motor fuel needs, etc. As discussed with reference to FIG. 5, consumers' 102 behavior with respect to choosing whether to purchase motor fuel pursuant to the terms of RCPPP 104 or purchase the commodity outside of the terms of RCPPP 104 can be referred to as an efficient exercise frontier.

Many consumers 102 with RCPPPs 104 will make purchase decisions based upon a combination of factors such as the residual price that consumer 102 must pay, the lock price, the time remaining under RCPPP 104, etc. Consumers 102 will in most situations act to maximize the value to them of having their RCPPP 104. In pump (or index) based settlements, whenever the retail price (or the index price) is above the lock price, consumer 102 can have an opportunity to exercise their right to take delivery of a quantity of motor fuel. In some situations, consumers 102 may choose not to take delivery by setting a high exercise price or to not use RCPPP 104. As the choice to exercise is consumers' 102 under the terms of some RCPPPs 104, some consumers 102 cannot be forced to exercise their rights.

Figure 5:
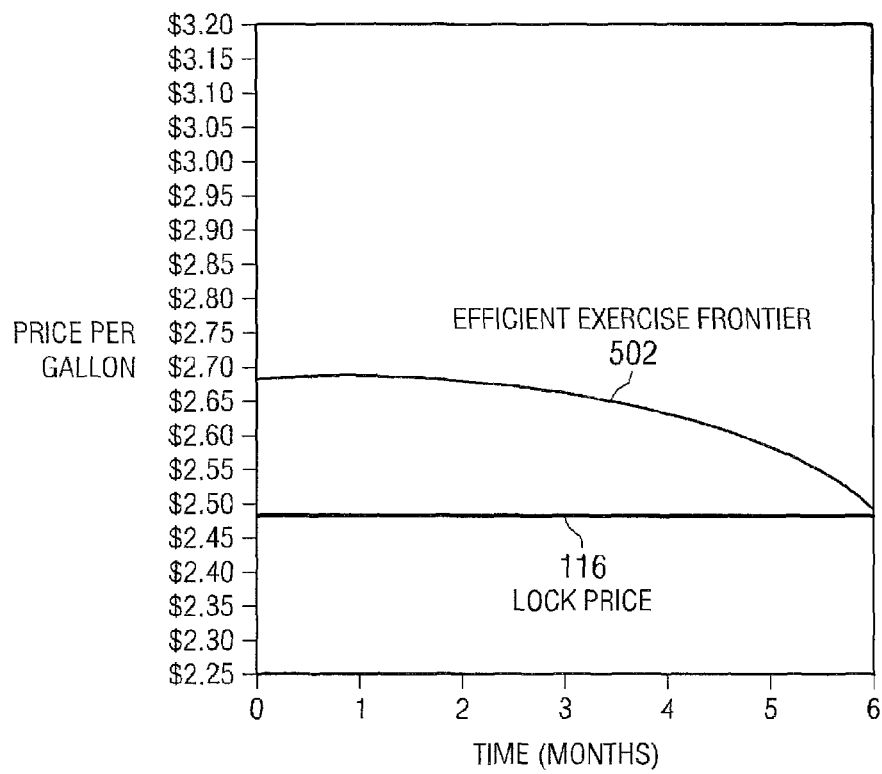
FIG. 5 presents graphs illustrating aspects of price protection services implemented by some embodiments.

FIG. 5 illustrates such consumer 102 decision making. Plot 502 shows the price at which (or above) some consumers 102 will tend to take delivery of price protected motor fuel. Plot 502 shows this threshold as a function of time into RCPPP 104 delivery time frame. For some embodiments, the delivery time frame can be six months, as illustrated, although many different lengths of delivery time frames are envisioned. As plot 502 shows, initially, with the entire delivery time frame remaining, large residual prices can influence some consumers 102 to purchase price protected motor fuel and deplete their virtual reserve. As time goes by, smaller residual prices can motivate some consumers 102 to purchase price protected motor fuel (as illustrated by intermediate portions of plot 502). At the end of the delivery time frame, even minute residual prices can motivate some consumers 102 to purchase price protected motor fuel as shown by plot 502.

Figure 6:
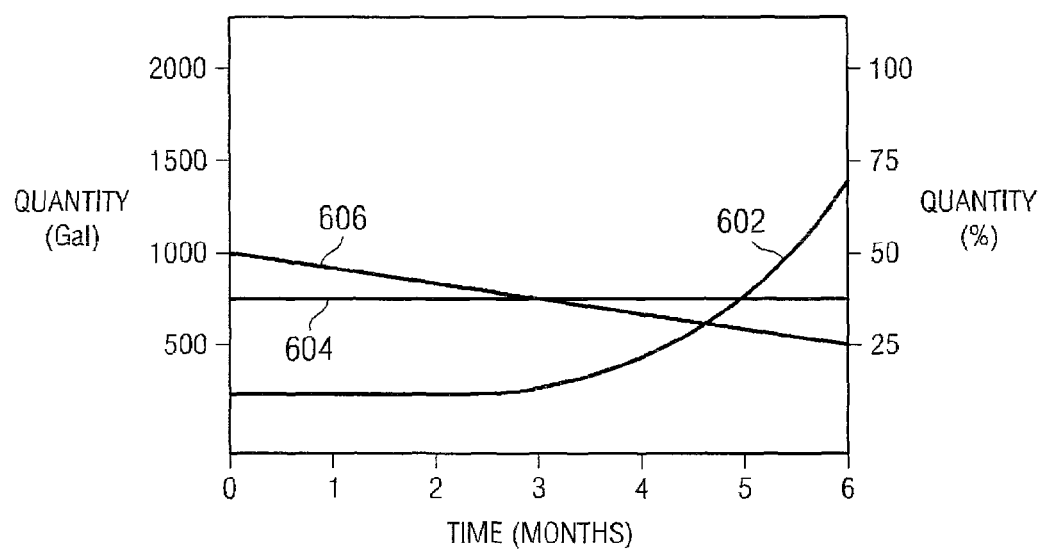
FIG. 6 presents graphs illustrating aspects of price protection services implemented by some embodiments.

FIG. 6 shows another aspect of likely consumer 102 purchasing behavior: the quantity of fuel consumer 102 is likely to buy is represented, in this example, as a function of the time remaining in some RCPPP delivery time frames. Initially, as illustrated by plot 602, some consumers 102 are unlikely to purchase any motor fuel since they might be expecting prices to be higher later in the delivery time frame. At intermediate times during the delivery time frame, some consumers 102 may begin purchasing more fuel as they sense that their opportunity to exercise under their RCPPP may be dwindling. At the end of the delivery time frame, as shown by plot 602, some consumers 102 will maximize their price protected purchases to maximize what value they can derive from their RCPPP during the soon-to-end delivery time frame. When consumers 102 delay taking delivery of their virtual reserves, as illustrated by FIGS. 5 and 6, RCPPP provider 118 must bear the risk of adverse price fluctuations and associated insurance costs so long as the virtual reserves exist.

Various embodiments disclosed herein may eliminate or constrain efficient exercise frontiers. In some embodiments, consumers 102 can be obligated to deplete their virtual reserves in manners specified by their RCPPP 104. Some depletion constraints may affect the allocation of risk between RCPPP provider 118 and consumers 102. Imposing depletion constraints on some consumers 102 may also affect the strike pricing model which determines how risk is laid off from RCPPP provider 118 to financial institution 116. As disclosed with respect to FIG. 1, strike price matrix 106 may be determined with or without any depletion constraints. In RCPPPs 104 which include depletion constraints, the price and other terms can be adjusted based on the depletion constraints. To entice consumer 102 to choose a depletion constraint, in some embodiments, incentives may be offered to consumer 102 in exchange for accepting the depletion constraint.

In various embodiments, depletion constraints have an associated and pre-defined time frame (which can be less than the overall delivery time frame of RCPPP 104) and an associated and pre-defined portion of the overall motor fuel quantity which is subject to RCPPP 104. Depletion constraints of the current embodiment can obligate consumer 102 to take delivery of the pre-defined portion of the motor fuel within the pre-defined time frame. If consumer 102 attempts to take delivery (or purchase) more than the pre-defined quantity of their virtual reserve within the defined time frame, consumer 102 can be charged the retail price for the motor fuel. If consumer 102 fails to take delivery of some portion of the amount required within the defined time frame, their rights to that portion of the price protected motor fuel might expire. In some embodiments, consumers 102 may be obligated to take delivery of the motor fuel at the lock price whenever the retail price exceeds the lock price. When the next pre-defined time frame begins, consumer 102 can continue depleting their virtual reserve.

Some depletion constraints may require consumers 102 to deplete their virtual reserves in a linear fashion within a defined time frame (which may include some or all of the delivery time frames) as illustrated by depletion constraint plot 604. The term "time frame" is used herein interchangeably with the word "period" to refer to an identifiable length of time. With such linear constraints, consumers 102 may be required to deplete their virtual reserves by fixed amounts during the predefined time frames. Plot 606 illustrates a linear depletion constraint which varies with time and is front loaded with more delivery obligations early in the delivery time frame compared to late in the delivery time frame.

In some embodiments, depletion constraints can include volume, mass, or weight based constraints, purchase amount based constraints, time based constraints, duration based constraints, etc. Depletion constraints can be described in a variety of ways such as a percentage of the virtual reserve, or a portion of the aggregate motor fuel pre-purchase price, per unit time. RCPPPs 104, or the portions of RCPPP 104s which specify the constraints, can be non-modifiable in some embodiments while in other embodiments RCPPPs 104 can be modifiable. In some embodiments, consumers 102 may elect to constrain all, a portion, or none of their virtual reserve within a specified time frame. In some embodiments, depletion constraints can include geographical limitation(s) such as a locale specified in RCPPP 104s.

In some embodiments, RCPPP provider 118 may impose a depletion constraint unilaterally, select one of the depletion constraints provided in strike price matrix 106, or change the depletion constraint provided to consumer 102. In some embodiments, RCPPP provider 118 can include a depletion constraint of its selection in RCPPP 104 before presenting it to consumer 102. In various embodiments, one or more depletion constraints may be presented to consumer 102 in alternate RCPPPs 104. Consumer 102 can then choose from the presented RCPPPs 104. Once consumer 102 has chosen a depletion constraint, consumer 102 can be directed to a checkout point.

Several scenarios illustrate aspects of certain types of depletion constraints. In one scenario, consumer 102 purchases RCPPP 104 for 200 gallons of motor fuel, with a lock price of $2.50, and with a delivery time frame of 6 months. RCPPP 104 of the current scenario can have a constant linear depletion constraint. The depletion constraint of the current scenario can require consumer 102 to take delivery of $\frac{1}{6}^{th}$ of the 200 gallon virtual reserve every month.

In one embodiment, the depletion constraint allows consumer 102 to take delivery of 10% of the overall motor fuel quantity per month for ten months. As one of ordinary skill in the art can appreciate, other depletion constraints are also possible such as 25% over six months, must use 100% in four months but no sooner than four months, etc.

In one scenario, consumer 102 initially selects RCPPP 104 contract which specifies a lock price of $2.25 based on a strike price of $2.00 with a hedge cost per gallon (HCPG) of $0.25 per gallon. In response, RCPPP provider 104 can present a modified RCPPP 104 to consumer 102 with a lower lock price of $2.20 but including one or more depletion constraints such as a restriction that consumer 102 can take delivery of up to 16.67% of consumers' 102 virtual reserve every month for six months (instead of the customer selected terms).

In another scenario, consumer 102 purchases RCPPP 104 for 200 gallons worth of gasoline or ethanol. RCPPP provider can present an alternate RCPPP to consumer 102 with a depletion constraint of 12.5 gallons of gas per week over 16 weeks. In this scenario, if consumer 102 buys 13 gallons of gas in the first week, consumer 102 can be allowed to purchase 12.5 gallons of the appropriate fuel under the terms of RCPPP 104. The allowed amount can be settled against the retail price (or in some embodiments against a defined index).

Consumer 102 can pay the difference for the 0.5 gallons of non-price protected fuel even though 87.5 gallons remain in the virtual reserve.

By constraining the depletion of the virtual reserves, RCPPPs 104 of some embodiments can eliminate, or greatly reduce, the ability of consumer to make decisions according to efficient exercise frontier 502 (of FIG. 5), delay taking delivery of price protected motor fuel, or otherwise increase the risk assumed by RCPPP provider of RCPPP 104s. Another advantage provided by some embodiments is that consumers 102 can be obligated to exercise their right to take delivery of the motor fuel by the terms of their RCPPP. Embodiments can also affect consumer behavior over the delivery time frame of their RCPPP. Including depletion constraints in RCPPPs 104 can also reduce risk and related insurance costs for RCPPP providers 104. RCPPP providers 104 can pass along some or all of the resulting savings to consumers 102 by adjusting the pricing model they might use to set prices for some RCPPPs 104.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below and their legal equivalents.

What is claimed is:

1. A method for constraining a consumer's ability to take delivery of a price protected commodity, comprising:
    providing to a consumer a price protection contract for the purchase of a commodity, wherein the price protection contract specifies a locale and at least one lock price and quantity such that commodity may be purchased at the lock price at one of a plurality of locations within the locale, wherein providing the price protection contract comprises:
    setting up an account associated with the price protection contract for the consumer at a price protection system accessible by the consumer over a network via one or more computing devices;
    creating a virtual reserve of the price protected commodity with the account, wherein the virtual reserve represents the quantity of the commodity available for purchase by the consumer under the price protection contract;
    specifying a time frame for the price protection contract, wherein the time frame comprises a plurality of time segments and each of the plurality of time segments is associated with a predefined quantity of the virtual reserve of the price protected commodity that is to be depleted during the time segment;
    receiving, by a price protection computer via a network, information from a computer at a retail location associated with the purchase of the commodity, wherein the information includes a retail price, a quantity, a time of purchase and information about the retail location,
    wherein if the quantity of the commodity is purchased within the locale, and the quantity is less than a current quantity of the virtual reserve and the quantity is less than the predefined quantity that is to be depleted during an associated time segment, the method further comprises:
    billing the consumer, by the price protection computer, according to the price protection contract; and
    depleting, by the price protection computer, the quantity from the virtual reserve.

2. The method of claim 1, wherein depletion of the price protected product is constrained to occur at a linear rate.

3. The method of claim 1, wherein for each purchase of a quantity of the commodity that is purchased outside the locale, which exceeds the virtual reserve, or which exceeds the predefined quantity, the method further comprises billing the consumer at a second price.

4. The method of claim 3, wherein the second price is an index.

5. The method of claim 3, wherein the second price is the retail price.

6. The method of claim 3, wherein the second price is the retail price minus a discount.

7. The method of claim 1, wherein a quantity of the commodity that is purchased at a retail price below the lock price does not deplete the virtual reserve.

8. A system for constraining a consumer's ability to take delivery of a price protected commodity, comprising:
    a processor; and
    a machine-readable non-transitory medium having stored thereon a plurality of instructions, the plurality of instructions executable by the processor to perform:
    associating a locale and at least one lock price and quantity with a price protection contract for the purchase of a commodity such that commodity may be purchased at the lock price at one of a plurality of locations within the locale, wherein providing the price protection contract comprises:
    setting up an account associated with the price protection contract for a consumer at a price protection system accessible by the consumer over a network via one or more computing devices;
    creating a virtual reserve of the price protected commodity with the account, wherein the virtual reserve represents the quantity of the commodity available for purchase by the consumer under the price protection contract;
    specifying a time frame for the price protection contract, wherein the time frame comprises a plurality of time segments and each of the plurality of time segments is associated with a predefined quantity of the virtual reserve of the price protected commodity that is to be depleted during the time segment;
    receiving, via a network, information from a computer at a retail location associated with the purchase of the commodity, wherein the information includes a retail price, a quantity, a time of purchase and information about the retail location,
    wherein if the quantity of the commodity is purchased within the locale, and the quantity is less than a current quantity of the virtual reserve and the quantity is less than the predefined quantity that is to be depleted during an associated time segment, the method further comprises:
    billing the consumer according to the price protection contract; and
    depleting the quantity from the virtual reserve.

9. The system of claim 8, wherein depletion of the price protected product is constrained to occur at a linear rate.

10. The system of claim 8, wherein for each purchase of a quantity of the commodity that is purchased outside the locale, which exceeds the virtual reserve, or which exceeds the predefined quantity, the method further comprises billing the consumer at a second price.

11. The system of claim 10, wherein the second price is an index.

12. The system of claim 10, wherein the second price is the retail price.

13. The system of claim 10, wherein the second price is the retail price minus a discount.

14. The system of claim 10, wherein a quantity of the commodity that is purchased at a retail price below the lock price does not deplete the virtual reserve.

15. A method of constraining a consumer's ability to take delivery of a price protected commodity, comprising:

receiving, by a price protection computer coupled to a network, information associated with the purchase of the commodity from a computer associated with a retail location, wherein the information includes a retail price, a quantity, a time of purchase and information about the retail location;

determining, by the price protection computer, whether the quantity of the commodity is purchased within a locale specified in a price protection contract; and determining whether the quantity purchased is less than a virtual reserve representing the quantity of the commodity available for purchase by the consumer under the price protection contract; and determining whether a quantity of the commodity purchased within a time segment is less than a predefined quantity of the virtual reserve that is to be depleted during that time segment, wherein if the quantity of the commodity is purchased within the locale, and the quantity is less than a current quantity of the virtual reserve and the quantity is less than the predefined quantity that is to be depleted during an associated time segment, the method further comprises:

billing the consumer, by the price protection computer, according to the price protection contract; and depleting, by the price protection computer, the quantity from the virtual reserve.

16. The method of claim 15, wherein for each purchase of a quantity of the commodity that is purchased outside the locale, which exceeds the virtual reserve, or which exceeds the predefined quantity, the method further comprises billing the consumer at a second price.

17. The method of claim 16, wherein the second price is the retail price.

18. The method of claim 16, wherein the second price is an index price.

19. The method of claim 16, wherein the second price is the retail price.

20. The method of claim 16, wherein the second price is the retail price minus a discount.

\* \* \* \* \*